Nov. 20, 1928.  1,692,378
J. A. KEENA ET AL
DEVICE FOR TESTING AUTOMOBILE TIRE INNER TUBES
Filed Aug. 1, 1927   2 Sheets-Sheet 1
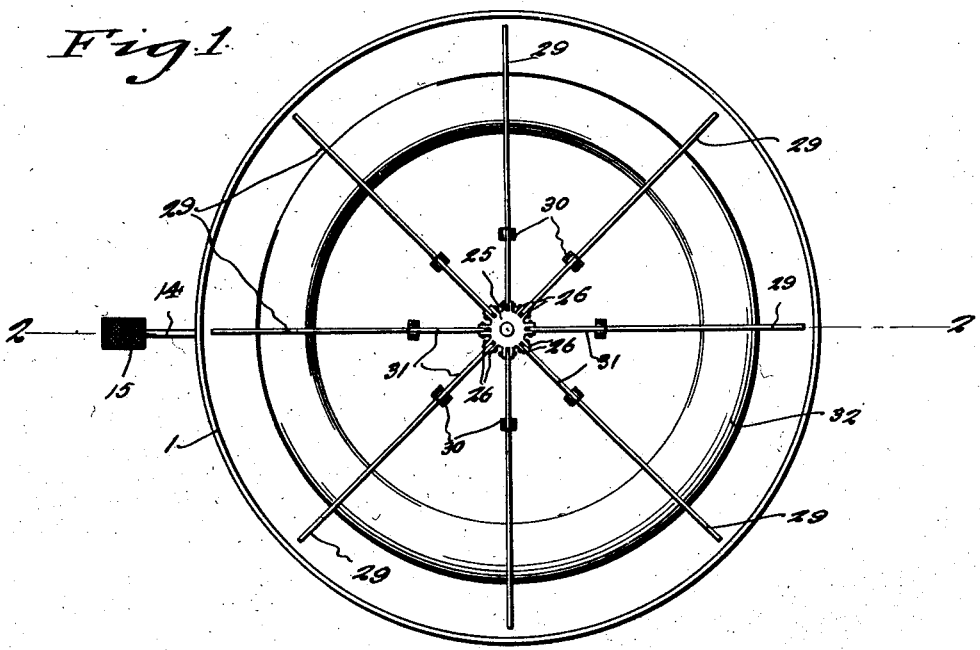
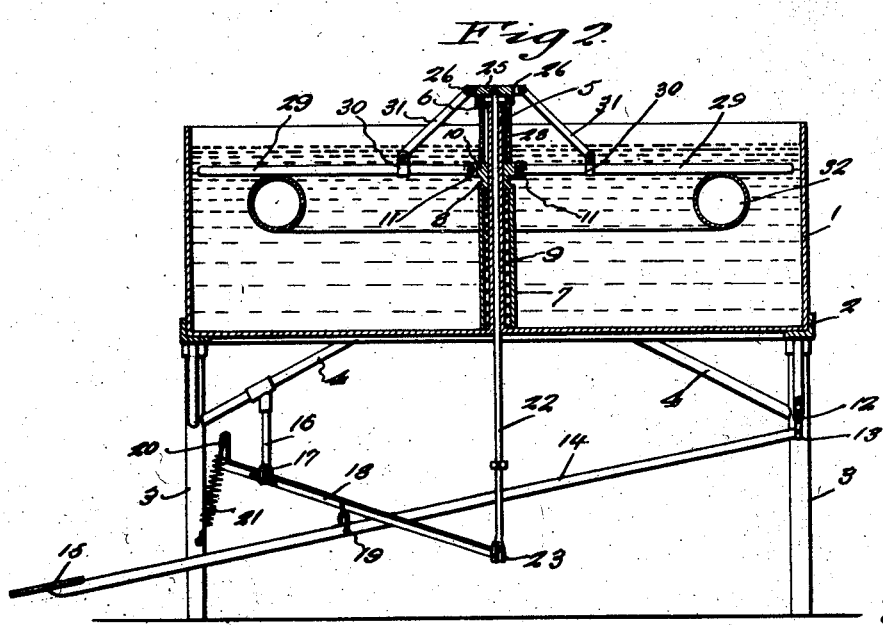
Inventor
James A. Keena
Jessie L. Sharkey
Attorney Nov. 20, 1928.  
J. A. KEENA ET AL  
1,692,378  
DEVICE FOR TESTING AUTOMOBILE TIRE INNER TUBES  
Filed Aug. 1, 1927  2 Sheets-Sheet 2
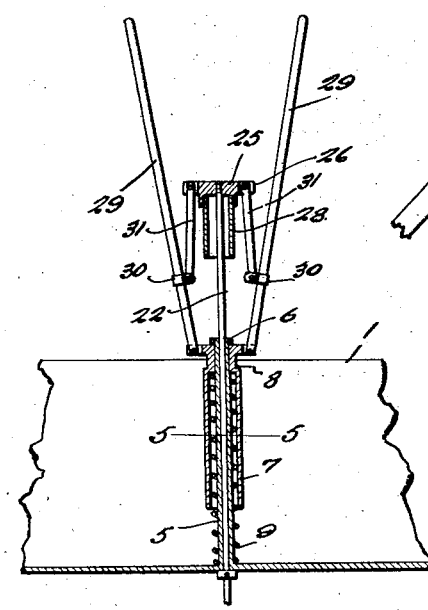
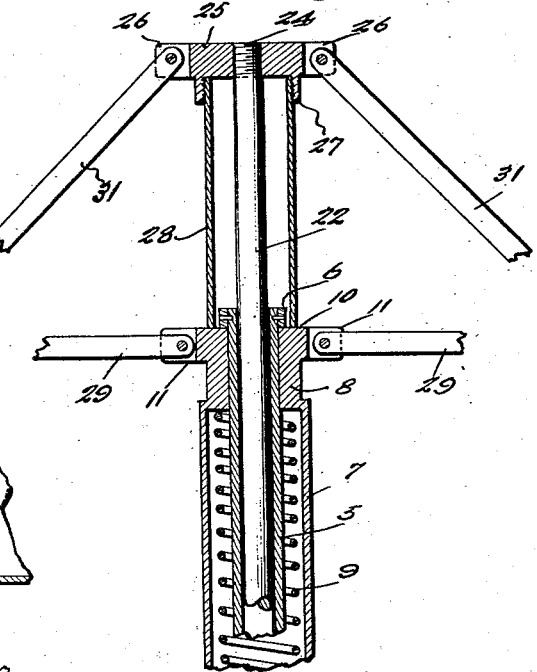
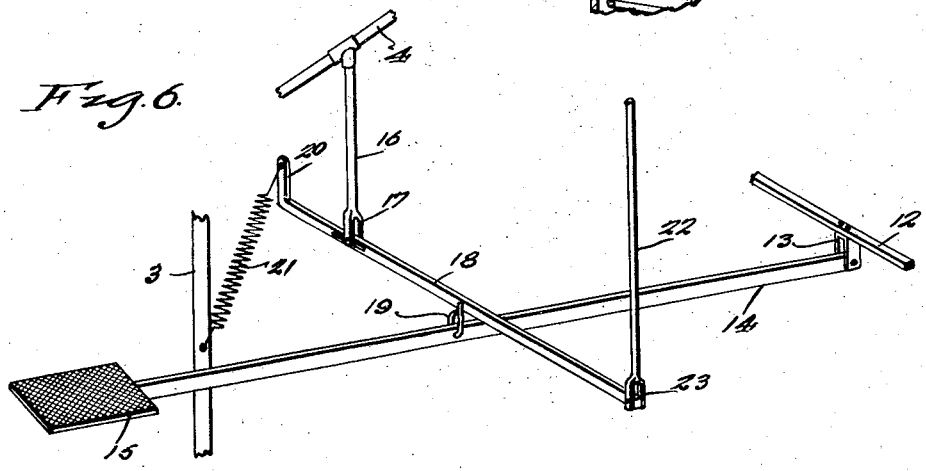
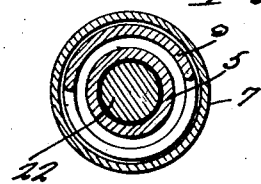
Inventor  
James A. Keena  
Jessie L. Sharkey  
By  
Attorney Patented Nov. 20, 1928.

1,692,378

UNITED STATES PATENT OFFICE.

JAMES A. KEENA AND JESSE L. SHARKEY, OF HUTCHINSON, KANSAS.

DEVICE FOR TESTING AUTOMOBILE TIRE INNER TUBES.

Application filed August 1, 1927. Serial No. 209,693.

This invention relates to testing devices and pertains particularly to a device for testing automobile tire inner tubes to detect leaks therein.

The primary object of this invention is to provide means, in a manner as hereinafter set forth, whereby a partly inflated inner tube may be completely submerged in a body of water by a plurality of vertically shiftable and pivotally swingable members to facilitate the detection of punctures therein by noting the point or points on the tube from which air bubbles rise through the water.

As is well known the practice of submerging a partially inflated inner tube in a body of water to detect leaks therein, is old and as is also known the usual present practice is to hold sections of the tube in a container of water. This method is slow, messy and unreliable as leaks are sometimes missed when they occur at the point where the body of the tube enters the water, the rising air bubbles being mistaken for a part of the agitation caused by the slight movements of the hands and tube in the water.

The present invention contemplates the provision, in connection with a water tank, of a centrally arranged vertically shiftable structure in the tank carrying a plurality of hingedly attached radially extending and vertically swingable arms, which, from their normally upwardly directed position, open and swing downwardly with the downward movement of the vertically shiftable structure to force an inner tube, previously placed over the structure to surround it, downwardly and beneath the surface of the water in the tank.

Another object of the invention is to provide, in a manner as hereinafter set forth, a tire tube testing device wherein the major part of the movable structure is entirely out of the testing water when the device is at rest, thus retarding the rusting away of the metal parts, which would take place rapidly if kept continually in the water.

Still another object of the invention is to provide, in a manner as hereinafter set forth, an improved foot controlled lever structure whereby a straight vertical movement of the vertically shiftable structure is obtained.

Numerous other objects and advantages of the present invention will become apparent as the description of the same proceeds and the invention will be best understood from a consideration of the following detailed description taken in connection with the accompanying drawings forming a part of this specification, with the understanding, however, that the invention is not confined to any strict conformity with the showing of the drawings but may be changed or modified as long as such changes or modifications mark no material departure from the salient features of the invention as expressed in the appended claims.

In the drawings:—

Figure 1 is a top plan view of the device embodying the present invention.

Figure 2 is a vertical transverse section taken on the line 2—2 of Figure 1.

Figure 3 is a sectional view of the central portion of the device showing the tube submerging arms in raised inoperative position.

Figure 4 is an enlarged detailed sectional view of the upper portion of the arm actuating mechanism.

Figure 5 is a sectional view taken on the line 5—5 of Figure 3.

Figure 6 is a detailed view of the foot pedal and associate mechanism.

Referring now to the drawings in detail, wherein like numerals of reference indicate corresponding parts throughout the several views, the numeral 1 indicates a tank, preferably of one or one and a half feet in depth, which is normally filled with water. For convenience this tank is mounted at an appropriate height, preferably upon an annular base rim 2 supported by posts or legs 3, each of which is braced as indicated by the numeral 4.

The central portion of the tank bottom has extending upwardly therefrom the sleeve 5 which is open at both ends, the lower end opening through the tank bottom to the underside thereof, as shown. The upper end of this sleeve has a collar 6 thereabout and secured thereto.

Surrounding the sleeve 5 is an elongated cylinder 7 having a constricted neck portion 8 at the upper end which snugly engages the sleeve 5 to slide thereon, the cylinder 7 being spaced a substantial distance from the sleeve to provide sufficient room for a coiled spring 9 which surrounds the sleeve 5 and normally acts to project the cylinder upwardly, the collar 6 preventing the cylinder from leaving the sleeve. The upper end of the neck 8 is surrounded by the flange 10, from the periphery of which there projects a plurality of pairs of radially directed transversely apertured ears 11.

Mounted between a pair of the tank supporting legs 3 is a bar 12 from the under edge of which an inverted bracket 13 depends. Pivotally secured to the bracket 13 is one end of a treadle bar 14 which extends across beneath the tank and projects beyond the same carrying upon the free end thereof the pedal plate 15. Carried by and depending from one of the braces 4 is a supporting arm 16 having the free end bifurcated as at 17. Located between the bifurcations 17 is an auxiliary treadle bar 18 the same being attached adjacent one end to the arm 16 as shown in Figure 6 and extending across the bar 14 at substantially right angles thereto, the end of the longer portion terminating directly beneath the sleeve 5. The auxiliary bar 18 carries the pivotally attached link 19, which is pivotally secured to the underlying bar 14. That end of the bar 18 nearest the support 16 is turned upwardly as at 20, the upturned end being apertured to receive one end of a coiled spring 21, the other end of which is attached to an adjacent leg 3, at a point materially lower than the plane in which the other end lies. Extending through the sleeve 5 is a pull rod 22, the lower end being bifurcated as at 23 to receive the inner end of the bar 18. The upper end of this rod is threaded as at 24, for the purpose hereinafter described. The structure comprising the elements 14 to 21 is designed to permit the vertical actuation of the rod 22 by the foot of an operator of the testing device.

The threaded upper end of the rod 22 normally projects a substantial distance above the sleeve 5 and carries the circular disk 25 the periphery of which has formed or secured thereon a plurality of radially directed pairs of apertured ears 26. The under face of the disk 25 carries an annular internally threaded collar 27. Threaded into the collar 27 is one end of a tube 28 of relatively large diameter which of course surrounds the rod 22 and under certain conditions abuts at its lower end the flange 10 to cause the cylinder 7 to move downwardly as will be hereinafter described.

Located between each pair of ears 11 at the upper end of the cylinder 7 is one end of a relatively long arm 29, each of which carries intermediate its ends a clip 30 to which is attached one end of a link 31 the other end of the link being pivoted between a pair of the ears 26 of the head plate 25. The length of the links 31, and relation between the other parts is such that when the rod 22 is at the limit of its upward movement the arms 29 are all grouped and directed upwardly, the arms and links being likeable to the ribs and links of an umbrella arranged in inverted position.

In operating the present device, a partly inflated tube is placed over the raised arms 29 and lowered to rest upon the water in the tank 1. Upon depression of the bar 14 the bar 18 is simultaneously depressed, as will be readily understood, drawing the pull rod 22 downwardly. This action first pulls down the head 25 and tube 28 actuating the links 31 to swing downwardly the arms 29 to the outspread position shown in Figure 1. When the arms 29 are in the outspread position described the lower end of the tube 28 contacts with the flange 10 of the cylinder neck 8, farther downward movement of the rod 22 causing the cylinder 7 to be moved down against the tension of the spring 9, the arms 29 pressing the tube beneath the surface of the water in the tank and holding it submerged for the purpose of detecting the escape of air therefrom. Figure 2 shows the manner in which the device operates, the tube being indicated by the numeral 32.

Having thus fully described our invention, we claim:—

1. A tire tube tester comprising a tank, a vertically reciprocating member within the tank, arms pivoted to said member and arranged in a vertical position when said member is in its uppermost position and shiftable on the downward movement of said member to a horizontal position, means for raising and lowering said member including a rod extending downwardly through and below the tank, and actuating means coupled to said rod.

2. A tire tube tester comprising a tank, a vertically reciprocating member within the tank, arms pivoted to said member and arranged in a vertical position when said member is in its uppermost position and shiftable on the downward movement of said member to a horizontal position, a spring for raising said member and holding it normally elevated, a rod operable for drawing said member downwardly, said rod extending downwardly through and below the tank, and actuating means coupled to the rod.

3. A tire tube tester comprising a tank, a sleeve fixed to the bottom of the tank and extending upwardly thereinto, a cylinder slidably engaging said sleeve, arms pivotally connected to the cylinder and arranged in a vertical position when the cylinder is in its uppermost position and movable downwardly to a horizontal position when the cylinder is moved downwardly, a spring for elevating the cylinder, a rod extending through the sleeve and operatively coupled to the arms for forcing the arms and the cylinder downwardly when said rod is drawn downwardly, and actuating means coupled to the rod below the bottom of the tank.

4. A tire tube tester, comprising a tank, a vertically disposed sleeve centrally within the tank, a cylinder slidable upon said sleeve, arms pivotally carried upon said cylinder, and means for shifting the cylinder longitudinally of the sleeve and simultaneously swinging said arms from a normally vertical to a substantially horizontal position and radially disposed about the cylinder.

5. A tire tube tester, comprising a tank, a vertically disposed sleeve centrally within the tank, a cylinder slidable upon said sleeve, arms pivotally carried upon said cylinder, means for shifting the cylinder longitudinally of the sleeve and simultaneously swinging said arms from a normally vertical to a substantially horizontal position and radially disposed about the cylinder; and means for automatically shifting said cylinder to the upper end of said sleeve upon release of the first-mentioned shifting means.

6. A tire tube tester, comprising a tank, a vertically disposed and shiftable cylinder within the tank, a plurality of normally vertically disposed arm members pivotally attached to and about said cylinder, vertically reciprocating means for swinging said arms to substantially horizontal position, and means for coupling said first means with said cylinder upon the arms reaching horizontal position to cause the arms and cylinder to move vertically downwardly as a unit.

7. A tire tube tester, comprising a tank, a vertically disposed and shiftable cylinder within the tank, a plurality of normally vertically disposed arm members pivotally attached to and about said cylinder, vertically reciprocating means for swinging said arms to substantially horizontal position, means for coupling said first means with said cylinder upon the arms reaching horizontal position to cause the arms and cylinder to move vertically downwardly as a unit, and resilient means tensioned upon the downward movement of said cylinder for returning the same and said arms to raised position.

8. A tire tube tester, comprising a receptacle, a vertical sleeve arranged centrally therein, a cylinder body surrounding said sleeve and normally at the upper end of the sleeve, a rod extending through said sleeve, a plurality of arms pivotally attached to and about said cylinder and normally extending upwardly therefrom, link members attached at one end about the upper end of the rod and at their other ends to said arms, means for drawing said rod downwardly to shift the arms to substantially horizontal position about the cylinder, and means for coupling the rod with the cylinder after shifting a predetermined distance to draw the cylinder and arms downwardly together.

9. A tire tube tester, comprising a receptacle, a vertical sleeve arranged centrally therein, a cylinder body surrounding said sleeve and normally at the upper end of the sleeve, a rod extending through said sleeve, a plurality of arms pivotally attached to and about said cylinder and normally extending upwardly therefrom, link members attached at one end about the upper end of the rod and at their other ends to said arms, means for drawing said rod downwardly to shift the arms to substantially horizontal position about the cylinder, means for coupling the rod with the cylinder after shifting a predetermined distance to draw the cylinder and arms downwardly together, and a spring about said sleeve and within the cylinder for normally maintaining the cylinder at the upper end of the sleeve and the arms in raised position.

10. A foot lever mechanism for vertically reciprocating a pull rod of the character described, comprising a pair of crossed bars, one pivotally mounted at one end and the other pivotally suspended inwardly of one end and having its other end connected to said rod, a pivotal connection between said bars, and a central spring normally drawing downwardly on said other bar at the end adjacent the point of suspension.

In testimony whereof we affix our signatures.

JAMES A. KEENA.
JESSE L. SHARKEY.